(12) United States Patent
Comte et al.

(10) Patent No.: US 7,153,795 B2
(45) Date of Patent: Dec. 26, 2006

(54) GLASS AND GLASS-CERAMIC MATERIALS, ARTICLES AND METHOD OF PREPARING THE SAME

(75) Inventors: Marie Jaqueline Monique Comte, Fontenay aux Roses (FR); Sophie Peschiera, Champagne sur Seine (FR)

(73) Assignee: Eurokera, Chateau-Thierry (FR)

( * ) Notice: Subject to any disclaimer, the term of this patent is extended or adjusted under 35 U.S.C. 154(b) by 101 days.

(21) Appl. No.: 11/008,836

(22) Filed: Dec. 10, 2004

(65) Prior Publication Data

US 2005/0143246 A1 Jun. 30, 2005

(51) Int. Cl.
*C03C 10/14* (2006.01)
*C03C 10/12* (2006.01)

(52) U.S. Cl. ............................................. 501/4; 501/7
(58) Field of Classification Search ................ 501/4, 501/7
See application file for complete search history.

(56) References Cited

U.S. PATENT DOCUMENTS

| | | | |
|---|---|---|---|
| 4,461,839 A | 7/1984 | Rittler | 501/4 |
| 5,070,045 A | 12/1991 | Comte et al. | 501/4 |
| 5,446,008 A | 8/1995 | Krolla et al. | 501/68 |
| 5,492,869 A * | 2/1996 | Beall et al. | 501/7 |
| 5,512,520 A * | 4/1996 | Pfitzenmaier | 501/7 |
| 6,413,906 B1* | 7/2002 | Shimatani et al. | 501/4 |
| 6,515,263 B1 | 2/2003 | Mitra et al. | 219/443 |
| 6,528,440 B1 | 3/2003 | Vilato et al. | 501/7 |
| 6,593,258 B1* | 7/2003 | Shimatani et al. | 501/4 |

FOREIGN PATENT DOCUMENTS

| | | |
|---|---|---|
| EP | 1074520 A1 | 7/2001 |
| JP | 09188538 | 7/1997 |
| JP | 1100229 | 4/1999 |

\* cited by examiner

*Primary Examiner*—Karl Group
(74) *Attorney, Agent, or Firm*—Siwen Chen

(57) ABSTRACT

The present invention relates to novel glass and glass-ceramic materials, articles made from said novel glass-ceramics and to methods of preparing said novel glass-ceramics and articles. Said novel, transparent, translucent or opaque glass-ceramics, which contain, as main crystalline phase, a solid solution of β-quartz or of β-spodumene, essentially have the following composition, expressed as percentages by weight of oxides: 65 to 70% of $SiO_2$; 18 to 23% of $Al_2O_3$; >4 to 5% of $Li_2O$; 0 to <1% of MgO; 1 to 3% of ZnO; 0 to 2% of BaO; 1.8 to 4% of $TiO_2$; 1 to 2.5% of $ZrO_2$; 0.4 to 1% of $K_2O$ and/or $Na_2O$; with, advantageously, an effective and non-excess amount of at least one fining agent. The glass-ceramic material is also characterized by a water content of β-OH higher than 0.2 $mm^{-1}$, preferably higher than 0.4 $mm^{-1}$.

8 Claims, 1 Drawing Sheet

Wavelength (nm)

GLASS AND GLASS-CERAMIC MATERIALS, ARTICLES AND METHOD OF PREPARING THE SAME

FIELD OF THE INVENTION

The present invention relates to glass and glass-ceramic materials, articles and method of making the same. In particular, the present invention relates to glass-ceramic materials having β-quartz or β-spodumene as the predominant crystalline phase having a high β-OH level. The present invention is useful, for example, in the production of glass-ceramic articles such as cooktops, cook utensils, stove windows, and the like.

BACKGROUND OF THE INVENTION

In the prior art, numerous glass-ceramic materials and articles have been described, for use such as cooktops, cooking utensils, stove windows and the like.

In U.S. Pat. No. 5,446,008, glass-ceramics are described having improved transmission. With reference to this technical problem of transmission, it is taught that the water content of the glass-ceramic must be controlled. Said water content must in fact be less than 0.03 mol/l. Moreover, in this reference, the technical problems of mechanical strength and thermal expansion were not tackled.

In U.S. Pat. No. 4,461,839, other glass-ceramics are described. Their composition, which is almost free from MgO, is not optimized with reference to said technical problems of mechanical strength and of thermal expansion.

In European patent application publication No. EP-A-1 170 264, the problem of surface cracking of the glass-ceramics is discussed and, with reference to said problem, novel glass-ceramics are proposed which are original through their composition and their state of crystallization.

U.S. Pat. No. 5,070,045 describes glass-ceramic materials having β-spodumene or β-quartz solid solution as the predominant crystalline phase. The glass-ceramic materials comprising β-spodumene solid solution as the predominant crystalline phase have an opaque, white or colored, appearance. They are opaque in the visible, in order to prevent the users of plates from being dazzled by heating elements which are placed under such plates, but they keep a high transmission in the infrared, so as to improve the heating of the cooking utensils which are placed on said plates. Said utensils are heated not only by conduction but also by radiation. The glass-ceramic mateiral is obtained by heat treatment of the glass precursor, which comprises a step of crystallization at a temperature on the order of 1,070° C. to 1,090° C. The higher the temperature of this crystallization step is, the more the opacity of the material.

These glass-ceramics and the method of obtaining them are described more specifically in the patent application WO-A-99 06334.

Though the materials have been used in widely commercialized glass-ceramic products, there is still room for improvement:

a) said plates of β-spodumene are less efficient than their β-quartz counterparts, which are also described in U.S. Pat. No. 5,070,045, in terms of mechanical strength and thermal expansion; and b) where more opaque products are desired (e.g., for use in a context of heating by induction), it is suitable to ceramize the glass precursor at a higher temperature (≧+20° C.). As a result, cracks can be generated in the structure of the glass-ceramic. In the past, it was observed that a lower mechanical strength and the presence of cracks, when the ceramization temperature is increased, were linked to the presence of water content in the glass precursor. It is known that the water can be incorporated in said glass precursor during its melting. The water content of said glass does in fact depend upon the state of the starting materials used and upon the means of melting used. Thus, if the precursor glasses of the glass-ceramics are melted from starting materials which contain little water in an electric oven, the resulting glass-ceramics tend to have a high mechanical strength and do not have a tendency to crack, even if the ceramization is carried out at high temperature. Glasses having low water content can similarly be used by adding halogens into their basic composition. This is described in U.S. Pat. No. 5,446,008. Industrially however, it is highly desired to not have to be concerned about controlling the water content of the glass. It is notably desired to be able to implement methods of melting employing burners of air-natural gas type or oxygen-natural gas type. The person skilled in the art cannot ignore that the use of such means of melting lead to significant contents of water in the glasses. It is the water contents which limit the ceramization temperatures.

Thus, in accordance with the invention, the improvement sought after to said β-spodumene glass-ceramic materials has been along two lines. It was desired both to increase the mechanical strength and to avoid the appearance of cracks (in the case of glasses which contain much water and/or for ceramizations at high temperature) and to decrease the thermal expansion.

Furthermore, the glass precursor of the glass-ceramics of the invention are also suitable for obtaining efficient glass-ceramics of main crystalline phase of β-quartz. It therefore enables the manufacture of various transparent or opaque products from the same glass precursor composition. This flexibility of the method in question is highly desirable in the art.

Said person skilled in the art has therefore already understood the interest of the present invention, the main subject of which consists of novel glass-ceramic compositions which are suitable for efficient β-quartz and β-spodumene glass-ceramics, more particularly β-spodumene glass-ceramics which are more efficient than those of the prior art (U.S. Pat. No. 5,070,045 and WO-A-99 06334).

SUMMARY OF THE INVENTION

According to a first aspect of the present invention, it is provided a transparent, translucent or opaque glass-ceramic material containing, as main crystalline phase, solid solution of β-quartz or β-spodumene, characterized in that: (i) it essentially has the following composition, expressed as percentages by weight of oxides:

65 to 70% of $SiO_2$
18 to 23% of $Al_2O_3$
>4 to 5% of $Li_2O$
0 to <1% of $MgO$
1 to 3% of $ZnO$
0 to 2% of $BaO$
1.8 to 4% of $TiO_2$
1 to 2.5% of $ZrO_2$
0.4 to 1% of $K_2O$ and/or $Na_2O$;

with, advantageously, an effective and non-excess amount of at least one fining agent; and (ii) it has a β-OH value of higher than 0.2 $mm^{-1}$, preferably higher than 0.4 $mm^{-1}$.

Preferably, the glass-ceramic material of the present invention comprises β-spodumene solid solution as the main crystalline phase.

In a preferred embodiment of the glass-ceramic material of the present invention, the composition of the glass-ceramic contains $As_2O_3$ and/or $Sb_2O_3$, as fining agent, in the following percentages by weight:

$As_2O_3$ 0–1.5
$Sb_2O_3$ 0–1.5
with $As_2O_3+Sb_2O_3$ 0.5–1.5.

According to another preferred embodiment of the glass-ceramic material of the present invention, the composition of the glass-ceramic material further comprises an effective amount of at least one colorant, advantageously selected from CoO, $Cr_2O_3$, $Fe_2O_3$, $MnO_2$, NiO, $V_2O_5$, $CeO_2$ and their mixtures.

According to a second aspect of the present invention, it is provided an article made from a glass-ceramic material of the present invention described above, which is preferably selected from the group consisting of a cook-top, a cooking utensil, a microwave oven plate, a fireplace window, a fire-door or fire-window, a pyrolysis oven window and a catalysis oven window.

A third aspect of the present invention involves an inorganic glass, which is a precursor of a glass-ceramic material according to the present invention, characterized in that: (i) it essentially has the following composition, expressed as percentages by weight of oxides:

65 to 70% of $SiO_2$
18 to 23% of $Al_2O_3$
>4 to 5% of $Li_2O$
0 to <1% of MgO
1 to 3% of ZnO
0 to 2% of BaO
1.8 to 4% of $TiO_2$
1 to 2.5% of $ZrO_2$
0.4 to 1% of $K_2O$ and/or $Na_2O$;

with, advantageously, an effective and non-excess amount of at least one fining agent; and (ii) it has a β-OH value of higher than 0.2 $mm^{-1}$, preferably higher than 0.4 $mm^{-1}$.

A fourth aspect of the present invention is a method of preparing a glass-ceramic material or article of the present invention described above, characterized in that it comprises heat-treating a crystallizable inorganic glass precursor of the glass-ceramic described above under conditions which ensure its ceramization. Preferably, in order to prepare a glass-ceramic material and/or article containing β-spodumene solid solution as the main crystalline phase, the heat treatment comprises a step of crystallization at a temperature of between 1,050 and 1,200° C. Preferably, in order to produce glass-ceramic materials and/or articles having β-quartz solid solution as the main crystalline phase, the heat treatment comprises a step of crystallization at a temperature of between 840 and 900° C.

The present invention has the surprising benefit that, because of the choice of composition, notwithstanding the high water content of at least 0.2 $mm^{-1}$, preferably at least 0.4 $mm^{-1}$ in the precursor glass, the glass-ceramic composition comprising β-spodumene solid solution as the main crystalline phase can be obtained at a high ceramming temperature without cracking and reduction in mechanical strength. Further, the cerammed material and/or articles have a low thermal expansion. In addition, effective glass-ceramic materials and/or articles comprising β-quartz solid solution as the main crystalline phase can be produced as well from the precursor glass of the present invention.

Additional features and advantages of the invention will be set forth in the detailed description which follows, and in part will be readily apparent to those skilled in the art from the description or recognized by practicing the invention as described in the written description and claims hereof as well as the appended drawing.

It is to be understood that the foregoing general description and the following detailed description are merely exemplary of the invention, and are intended to provide an overview or framework to understanding the nature and character of the invention as it is claimed.

DETAILED DESCRIPTION OF THE INVENTION

Figure 1:
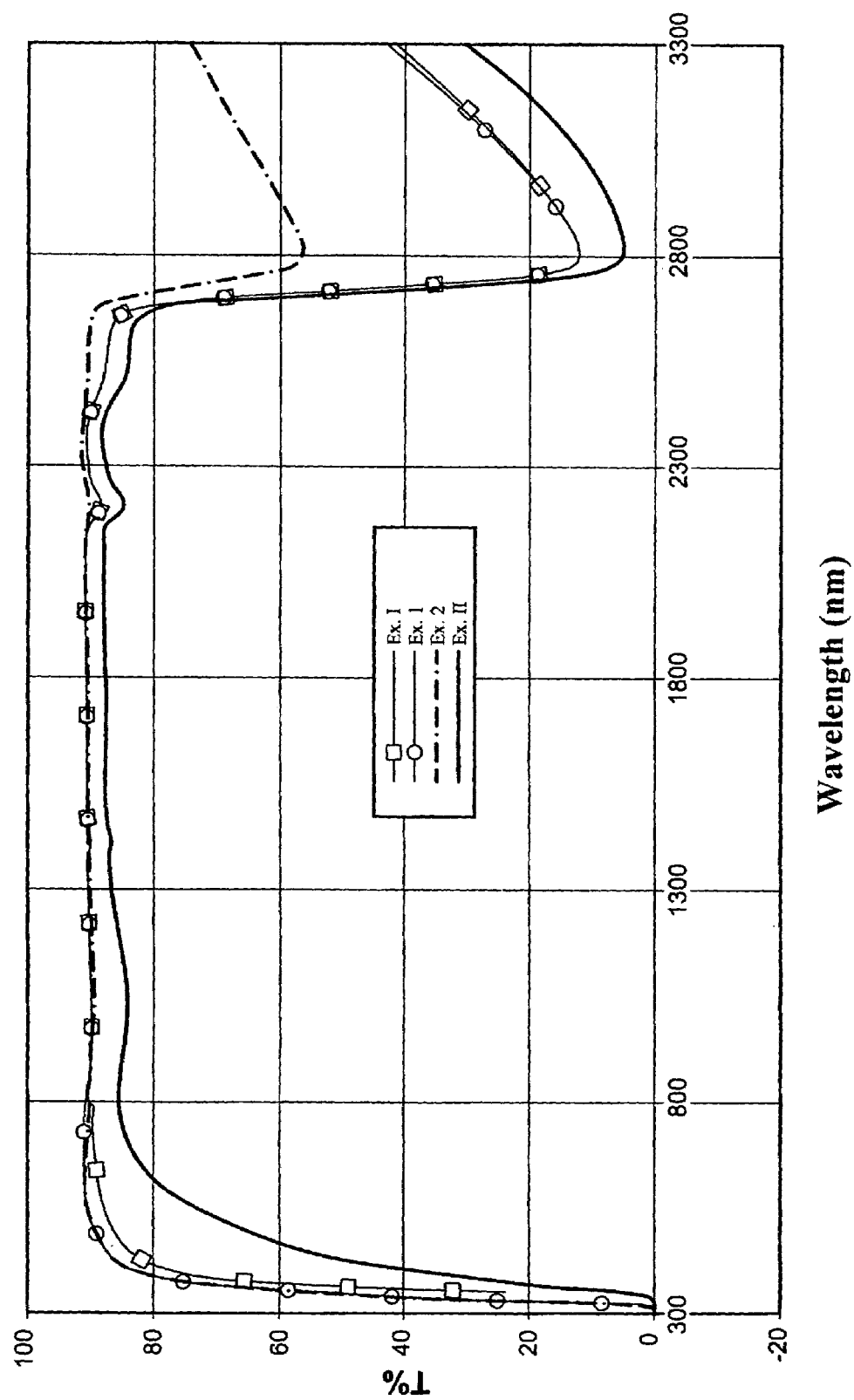
FIG. 1, is a diagram showing the transmission curves of the glass-ceramic materials in the Examples of the present invention and Comparative Examples.

The glass-ceramic materials of the present invention, which can exist in transparent, translucent (opalescent) or opaque form, i.e., which contain β-quartz or β-spodumene as main crystalline phase, are characterized in that they essentially have the following composition, expressed in percentages by weight of oxides:

65 to 70% of $SiO_2$
18 to 23% of $Al_2O_3$
>4 to 5% of $Li_2O$
0 to <1% of MgO
1 to 3% of ZnO
0 to 2% of BaO
1.8 to 4% of $TiO_2$
1 to 2.5% of $ZrO_2$
0.4 to 1% of $K_2O$ and/or $Na_2O$;

with, advantageously, an effective and non-excess amount of at least one fining agent, and in that it comprises a β-OH value of over 0.2 $mm^{-1}$, and preferably over 0.4 $mm^{-1}$.

The relative contents of each one of the constituent oxides are relatively critical. Thus:

$Al_2O_3$: it was observed that an increase in the content of $Al_2O_3$ is favorable to an improvement of the mechanical properties. Too high a content of said $Al_2O_3$ does however unacceptably increase the thermal expansion of the glass-ceramic material;

$Li_2O$: characteristically, it is incorporated at more than 4%, advantageously more than 4.1% by weight of this oxide in order to obtain a low thermal expansion. Over 5% of $Li_2O$ and the crystallization becomes difficult to control;

MgO: over 1% of MgO and the thermal expansion is not acceptable;

ZnO: ZnO enables, with $Li_2O$, the coefficient of thermal expansion of the glass-ceramics to be adjusted. Thus, it must be incorporated at less than 1%. At too high a content (>3%), a risk is taken of crystallizing other crystalline phases, such as spinels, which have a high thermal expansion;

BaO: BaO is an optional element which enables the viscosity of the glass precursor to be adjusted. It remains in the amorphous phase of the glass-ceramic. If it is incorporated in an amount which is greater than 2%, it is difficult to keep a low thermal expansion;

$TiO_2$ and $ZrO_2$ are incorporated as nucleation agents. If they are incorporated in too low an amount, the precursor glass does not crystallize; if they are incorporated in too high an amount, the devitrification, upon cooling, can be difficult to control;

Na$_2$O and K$_2$O enable the problems of mechanical strength and surface cracking to be limited. These constituents remain in the amorphous phase of the glass-ceramic. If they are incorporated in too great an amount, they have a harmful effect upon the thermal expansion.

Within the composition set forth, it was possible, in a non-obvious manner, to take advantage of the beneficial action, of Al$_2$O$_3$ and/or K$_2$O and/or Na$_2$O, on the mechanical properties (also on the absence of cracks) while at the same time limiting, even compensating for, mainly by virtue of Li$_2$O, their harmful action on the thermal expansion.

The optional constituents, MgO and BaO, when they are present, are generally present at at least 0.1% by weight.

The composition specified above advantageously contains an effective and non-excess amount of at least one fining agent. The person skilled in the art knows well how to manage the incorporation of this type of compounds within the glass precursor. In general, it is incorporated at less than 3% by weight, rather at less than 2% by weight of this type of compounds.

As indicated in U.S. Pat. No. 5,070,045, As$_2$O$_3$ and/or Sb$_2$O$_3$ are in general incorporated as fining agent in the following amounts:

|      | As$_2$O$_3$ | 0–1.5 |
|------|-------------|-------|
|      | Sb$_2$O$_3$ | 0–1.5 |
| with | As$_2$O$_3$ + Sb$_2$O$_3$ | 0.5–1.5 (% by weight). |

Similarly, other fining agents, such as SnO$_2$, CeO$_2$, fluorides or sulfates, alone or in a mixture, can be incorporated.

The glass-ceramic of the invention may be colored or not. In order for it to have a real coloration, it contains, in addition to its constituent elements listed above, an effective amount, which does not in general exceed 2% by weight, of at least one colorant. Said colorant(s) is(are) advantageously selected from CoO, Cr$_2$O$_3$, Fe$_2$O$_3$, MnO$_2$, NiO, V$_2$O$_5$, CeO$_2$ (and their mixtures).

As colored glass-ceramics (black, transparent) of the invention, those which have the composition by weight indicated above are more particularly preferred with, in addition, 0.03 (advantageously 0.05) to 1% by weight of V$_2$O$_5$ and the following condition: 3.8%≦TiO$_2$+ZrO$_2$+5V$_2$O$_5$≦6%; as well as a main crystalline phase of β-quartz.

It has been surprisingly found that water content, expressed in terms of β-OH value in the glass and glass-ceramic materials, higher than 0.2 mm$^{-1}$, even higher than 0.4 mm$^{-1}$, does not negatively affect the transmission, mechanical strength and thermal expansion of the glass-ceramic materials of the present invention, contrary to the teachings regarding water content in the prior art discussed above. Since such water level is not incompatible with conventional glass-melting technology, especially those using oxygen-fuel or air-fuel burners, the glass and glass-ceramic materials of the present invention are particularly advantageous and preferred for industrial production.

According to the teaching of U.S. Pat. No. 5,446,008, particularly with reference to the problem of transmission, the maximum water content acceptable was fixed at less than 0.03 mol/l. It has furthermore been seen that this parameter had an influence upon the appearance of cracks, during ceramizations at high temperature.

The water content, within the composition of the glass and glass-ceramic of the present invention, was expressed by the β-OH value, which can be calculated directly from transmission curves. It was not expressed by the concentration, in mol/l, as in U.S. Pat. No. 5,446,008. The person skilled in the art cannot in fact ignore that it is difficult to convert the β-OH to water content expressed in mol/l, since this obliges having to know the index of the material at 2,800 nm and the coefficient of extinction of water in said material. These two parameters are difficult to measure.

In any case, the glass-ceramic materials of the invention, which are efficient in terms of transmission, of mechanical strength and of thermal expansion, can contain relatively high water contents (β-OH>0.2 mm$^{-1}$, even β-OH>0.4 mm$^{-1}$), which do not notably impose any constraint, during their preparation process. No particular precautions are required. These affirmations are confirmed by the Examples below.

It has been seen above that the glass-ceramic materials of the invention can exist with a predominant crystalline phase of β-quartz or β-spodumene solid solution. According to a preferred variant, the glass-ceramics of the invention are glass-ceramics having a predominant crystalline phase of β-spodumene solid solution. Such glass-ceramics, when they contain an effective amount of at least one colorant selected from CeO$_2$, MnO$_2$ and Fe$_2$O$_3$, have a beige color.

According to a second aspect, the present invention relates to crystallizable inorganic glasses which are precursors of the glass-ceramics described above. Said inorganic glasses, which are crystallizable and are precursors of the glass-ceramics above, essentially have the following composition, expressed in percentages by weight of oxides:

65 to 70% of SiO$_2$
18 to 23% of Al$_2$O$_3$
>4 to 5% of Li$_2$O
0 to <1% of MgO
1 to 3% of ZnO
0 to 2% of BaO
1.8 to 4% of TiO$_2$
1 to 2.5% of ZrO$_2$
0.4 to 1% of K$_2$O and/or Na$_2$O;

with, advantageously, an effective and non-excess amount of at least one fining agent. The glass has advantageously a β-OH value higher than 0.2 mm$^{-1}$, preferably higher than 0.4 mm$^{-1}$.

Said inorganic glasses are optionally colored. According to what has been seen above, they can notably contain an effective amount of at least one of the following colorants: CoO, Cr$_2$O$_3$, Fe$_2$O$_3$, MnO$_2$, NiO, V$_2$O$_5$ and CeO$_2$.

According to a third aspect, the present invention relates to articles made from a glass-ceramic materials as described above. The articles in question can notably be selected from the group consisting of a cook-top, a cooking utensil, a microwave oven plate, a fireplace window (fireguard plate), a fire-door or fire-window or a pyrolysis oven window or catalysis-oven window. They advantageously are cook-tops.

According to a fourth aspect, the present invention relates to the methods of preparation of glass-ceramic materials and articles.

Said methods constitute analogous methods, which are implemented characteristically with crystallizable inorganic glasses having the weight composition set forth above.

The glass-ceramic materials and articles of the invention are obtained by heat treating a crystallizable inorganic glass precursor, as characterized above, this heat treatment being implemented under conditions which ensure the ceramization of said glass precursor.

The glass-ceramic articles of the invention are obtained by such a heat treatment after shaping the crystallizable inorganic glass precursor in question. The shaping is a classical step. It can notably be pressing or rolling. It can notably be a shaping which is intended to confer the shape of a plate.

The heat treatment in question classically comprises a rise in temperature, which is generally in stages, up to the crystallization temperature maintained over an adequate period of time. Said heat treatment of the invention generally lasts less than 2 hours. This is another advantageous point of the present invention.

In order to obtain a glass-ceramic the main crystalline phase of which is β-spodumene solid solution, said heat treatment generally comprises the crystallization step at a temperature of between 1,050 and 1,200° C.

In order to obtain a glass-ceramic of the invention, the main crystalline phase of which is β-quartz solid solution, said heat treatment generally comprises the crystallization step at a temperature of between 840 and 900° C.

The invention is further illustrated by the following non-limiting Examples.

EXAMPLES

More specifically, the invention is illustrated, respectively:
- by Example I, the importance of which more particularly emerges upon consideration of Comparative Examples 1 and 2; and
- by Examples II and III, the importance of which more particularly emerges upon consideration of Comparative Example 3.

Example I (the Present Invention) and Comparative Examples 1 and 2

Said Comparative Examples 1 and 2 illustrate the prior art.

They differ from each other by the water content of the glass precursors of the glass-ceramics in question.

Table 1 below indicates:
- in its first part, the compositions by weight of the precursor glasses in question, as well as their water content (β-OH);
- in its second part, the characteristics of three glass-ceramics obtained from said glasses, after three different Ceramization Schedules.

The glasses were prepared in a usual manner from oxides and/or from compounds which are easily decomposable, such as nitrates or carbonates. The starting materials were mixed in order to obtain a homogeneous mixture. 1,000 g of starting materials, which were placed in a platinum crucible, were melted in an electric oven for 12 hours at 1,650° C.

After melting, the glasses were shaped into plates of 6 mm thickness, which were annealed at 650° C. For the glasses which contain the most water (Example I and Comparative Example 1), hydrated alumina was used as starting material (anhydrous alumina was used in Comparative Example 2). The water contents of the glasses prepared (before ceramization) were compared.

In FIG. 1, transmission curves are given for the glasses according to said Example I of the present invention and Comparative Examples 1 and 2 of the prior art. The absorption peaks of the OHs, around 2,800 nm, are clearly visible. The fact that the glasses according to Comparative Example 1 and Example I of the present invention have almost identical water contents is thus easily seen (the curves merge around 2,800 nm). Said water contents are very much greater than that of the glass of Comparative Example 2.

The annealed plates were ceramised according to one or the other of the following ceramming schedules:

Ceramization Schedule 1:
26 minutes from ambient temperature to 660° C.
40 minutes from 660° C. to 830° C.
11 minutes from 830° C. to 1,000° C.
9 minutes from 1,000° C. to 1,070° C.
15 minutes at 1070° C.
rapid cooling to ambient temperature.

Ceramization Schedule 2:
26 minutes from ambient temperature to 660° C.
40 minutes from 660° C. to 830° C.
11 minutes from 830° C. to 1,000° C.
11 minutes from 1,000° C. to 1,090° C.
15 minutes at 1,090° C.
rapid cooling to ambient temperature.

Ceramization Schedule 3:
26 minutes from ambient temperature to 660° C.
51 minutes from 660° C. to 860° C.
15 minutes at 860° C.
rapid cooling to ambient temperature.

TABLE 1

|  | Comparative Examples | | Present Invention |
|---|---|---|---|
|  | 1 | 2 | Example I |
| 1. Composition | % (weight) | | |
| $SiO_2$ | 67.6 | 67.6 | 67.9 |
| $Al_2O_3$ | 19.85 | 19.85 | 19.6 |
| $Li_2O$ | 3.45 | 3.45 | 4.35 |
| MgO | 1.2 | 1.2 |  |
| ZnO | 1.6 | 1.6 | 1.6 |
| BaO | 0.8 | 0.8 | 0.8 |
| $TiO_2$ | 2.6 | 2.6 | 2.95 |
| $ZrO_2$ | 1.7 | 1.7 | 1.5 |
| $As_2O_3$ | 0.8 | 0.8 | 0.8 |
| $K_2O$ | 0.1 | 0.1 | 0.5 |

TABLE 1-continued

|  | Comparative Examples | | Present Invention |
|---|---|---|---|
|  | 1 | 2 | Example I |
| $Na_2O$ | 0.1 | 0.1 | 0.1 |
| $K_2O + Na_2O$ | 0.2 | 0.2 | 0.6 |
| β-OH | 0.281 mm$^{-1}$ | 0.067 mm$^{-1}$ | 0.284 mm$^{-1}$ |
| 2. Properties after ceramization | | | |
| Ceramization 1 (1,070° C./15 minutes) | | | |
| Thermal expansion (20–700° C.) | 10 × 10$^{-7}$ K$^{-1}$ | | 6 × 10$^{-7}$ K$^{-1}$ |
| Transmission at 800 nm | 35% | 32% | 40% |
| Transmission at 2,000 nm | 83% | 82% | 90% |
| MOR | 114(14)MPa | 209(38)MPa | 191(42)MPa |
| Ceramization 2 (1,090° C./15 minutes) | | | |
| Thermal expansion (20–700° C.) | | | |
| Transmission at 800 nm | 27% | 25% | 27% |
| Transmission at 2,000 nm | 80% | 77% | 87% |
| MOR | 124(6)MPa | 294(92)MPa | 195(52)MPa |
| Ceramization 3 (860° C./15 minutes) | | | |
| Thermal expansion (20–700° C.) | | | −3.8 × 10$^{-7}$ K$^{-1}$ |

In Table 1, β-OH (mm$^{-1}$) was calculated as follows:

$$\beta - OH = \frac{\log(T_{\max}/T_{\min})}{t}$$

where t is thickness of the sample in mm, $T_{max}$ is transmission at 2,600 nm, and $T_{min}$ is transmission at 2,800 nm. The MOR values were measured according to ASTM standard F394-78. Numbers in parentheses are standard deviation.

After ceramization, the thermal expansion, the transmissions at 800 and 2,000 nm, as well as the modulus of rupture of the glass-ceramics obtained, were therefore evaluated.

The glass of Comparative Example 1 contains a significant amount of OH. The glass-ceramics obtained from said glass—glass-ceramics comprising β-spodumene solid solution as the main crystalline phase, white in color and slightly translucent (that obtained after the Ceramization Schedule 2 is a little more opaque than that obtained after the Ceramization Schedule 1)—are not cracked. However, said glass-ceramics have low MOR values: 144 MPa and 124 MPa, respectively.

The glass of Comparative Example 2 is identical to that of Comparative Example 1, except that its OH content is much lower. Consequently, the glass-ceramics obtained from said glass—glass-ceramics comprising β-spodumene as the main crystalline phase, white in color and slightly translucent (that obtained after the Ceramization Schedule 2 is a little more opaque than that obtained after the Ceramization Schedule 1)—have higher MOR values: 209 MPa and 294 MPa, respectively.

The glass of Example I is a glass precursor of the invention. Despite a significant OH content (almost identical to that of the glass of Comparative Example 1), it does enable efficient glass-ceramics to be obtained, with regard to both:
- their low thermal expansion values, and
- their high MOR values (191 MPa and 195 MPa).

The glass-ceramics of the invention obtained by the Ceramization Schedules 1 and 2 are glass-ceramics of β-spodumene, white in color and slightly translucent. The glass-ceramic of the invention obtained by the Ceramization Schedule 3 is a glass-ceramic of β-quartz. It is transparent.

Examples II and III, and Comparative Example 3

Said Examples were carried out under more stringent conditions with reference to the water content of the precursor glasses.

The process for obtaining said glasses was comparable to that carried out in the preceding Examples (melting). However, throughout the whole melting, the surface of the glass was flushed with a current of water vapor. Consequently, the contents of water in the glasses were very high, higher than those in the glasses of Examples I, 1 or 2.

Table 2 is proposed below, which is of the same type as Table 1 above.

TABLE 2

|  | Comparative Example | The Present Invention Examples | |
|---|---|---|---|
|  | 3 | II | III |
| 1. Composition | | % (weight) | |
| $SiO_2$ | 68.8 | 67.9 | 67.8 |
| $Al_2O_3$ | 19 | 19.7 | 19.9 |
| $Li_2O$ | 3.35 | 4.3 | 4.2 |
| MgO | 1.2 | | |
| ZnO | 1.6 | 1.7 | 1.7 |
| BaO | 0.8 | 0.9 | 0.9 |
| $TiO_2$ | 2.6 | 3 | 3 |
| $ZrO_2$ | 1.8 | 1.5 | 1.5 |
| $As_2O_3$ | 0.4 | 0.4 | 0.4 |
| $K_2O$ | 0.1 | 0.5 | 0.1 |
| $Na_2O$ | 0.1 | 0.1 | 0.5 |
| $V_2O_5$ | 0.22 | | |
| β-OH | 0.45 mm$^{-1}$ | 0.48 mm$^{-1}$ | 0.46 mm$^{-1}$ |
| Ceramization 2 Cracks | yes | no | no |

In Table 2, the presence or not of cracks was observed with an optical microscope. The transmission curve of the glass-ceramic of Example II also appears in FIG. 1.

The glasses of the invention, despite their high water content (that can be estimated as greater than 0.05 mol/l), had enabled non-cracking glass-ceramics to be obtained.

The glass-ceramic of the prior art, with the same high water content, had a cracked surface.

The β-spodumene glass-ceramics of the invention can be obtained from glass precursors which are rich in water and/or cerammed at high ceramization temperatures.

The invention claimed is:

1. A transparent, translucent or opaque glass-ceramic material containing, as main crystalline phase, solid solution of β-quartz or β-spodumene, consisting essentially of the following composition, expressed as percentages by weight of oxides:

65 to 70% of $SiO_2$
 18 to 23% of $Al_2O_3$
 >4 to 5% of $Li_2O$
 0 to <1% of MgO
 1 to 3% of ZnO
 0 to 2% of BaO
 1.8 to 4% of $TiO_2$
 1 to 2.5% of $ZrO_2$
 0.4 to 1% of $K_2O$ and/or $Na_2O$;
 with an effective and non-excess amount of at least one fining agent; and (ii) it has a β-OH value of higher than $0.2$ mm$^{-1}$.

2. The glass-ceramic material according to claim 1, having β-OH value of higher than $0.4$ mm$^{-1}$.

3. The glass-ceramic material according to claim 1, the composition of which contains $As_2O_3$ and/or $Sb_2O_3$, as fining agent, in the following percentages by weight:

$As_2O_3$ 0–1.5
 $Sb_2O_3$ 0–1.5
 with $As_2O_3+Sb_2O_3$ 0.5–1.5.

4. The glass-ceramic material according to claim 1, the composition of which further contains an effective amount of at least one colorant.

5. The glass-ceramic material according to claim 4, wherein the at least one colorant is selected from the group consisting of CoO, $Cr_2O_3$, $Fe_2O_3$, $MnO_2$, NiO, $V_2O_5$, $CeO_2$ and their mixtures.

6. The glass-ceramic material according to claim 1, which contains, as main crystalline phase, a solid solution of β-spodumene.

7. An article made from a glass-ceramic material according to claim 1.

8. An article according to claim 7, which is selected from the group consisting of a cook-top, a cooking utensil, a microwave oven plate, a fireplace window, a fire-door or fire-window, a pyrolysis oven window and a catalysis oven window.

* * * * *